(12) United States Patent
Tsai

(10) Patent No.: US 7,004,038 B2
(45) Date of Patent: Feb. 28, 2006

(54) FIBER OPTIC FLOW METER

(75) Inventor: John C. Tsai, Saratoga, CA (US)

(73) Assignee: Fibera, Inc., Santa Clara, CA (US)

( * ) Notice: Subject to any disclaimer, the term of this patent is extended or adjusted under 35 U.S.C. 154(b) by 0 days.

(21) Appl. No.: 10/905,419

(22) Filed: Jan. 3, 2005

(65) Prior Publication Data

US 2005/0145039 A1    Jul. 7, 2005

Related U.S. Application Data

(60) Provisional application No. 60/481,851, filed on Jan. 2, 2004.

(51) Int. Cl.
*G01F 1/28* (2006.01)
(52) U.S. Cl. .................................. 73/861.71
(58) Field of Classification Search ..................... None
See application file for complete search history.

(56) References Cited

U.S. PATENT DOCUMENTS 4,584,883 A * 4/1986 Miyoshi et al. .......... 73/861.24

* cited by examiner

*Primary Examiner*—Harshad Patel
(74) *Attorney, Agent, or Firm*—Raymond E. Roberts; Intellectual Property Law Offices

(57) ABSTRACT

A metering module, or a system employing such, for monitoring fluid flow with a laser light source, a light detector and a processor, wherein the fluid may be a gas or liquid. A valve section and a grating section including a fiber Bragg grating (FBG) are provided. The valve section applies strain on the FBG that is representative of the flow of the fluid. An optical fiber couples a probing laser signal to the FBG and the FBG reflects a portion back as a return laser signal that the optical fiber couples to the light detector for detection and processing.

14 Claims, 9 Drawing Sheets

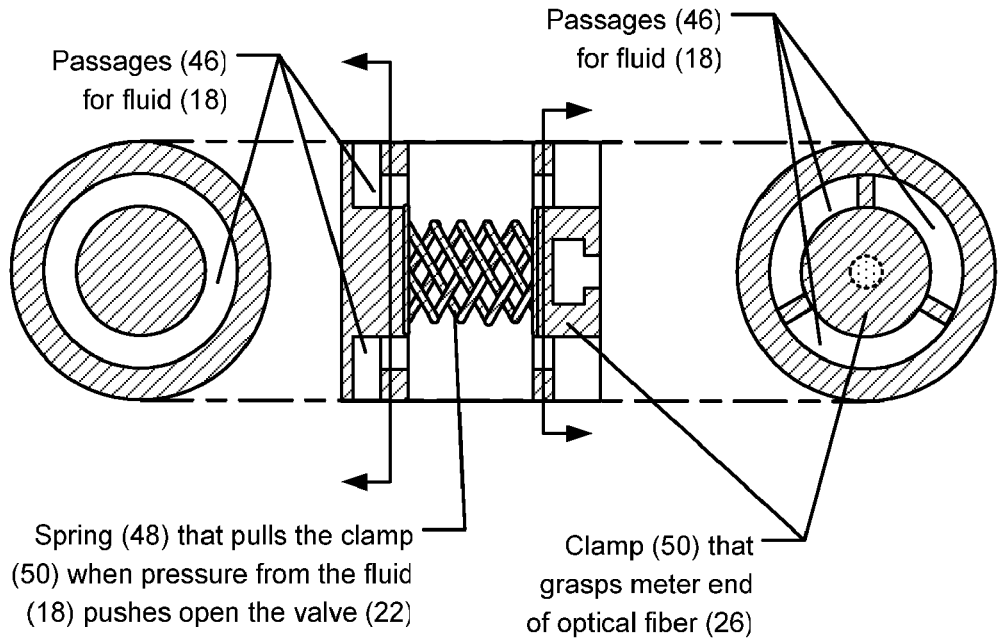
FIG. 3a. Valve section (22)
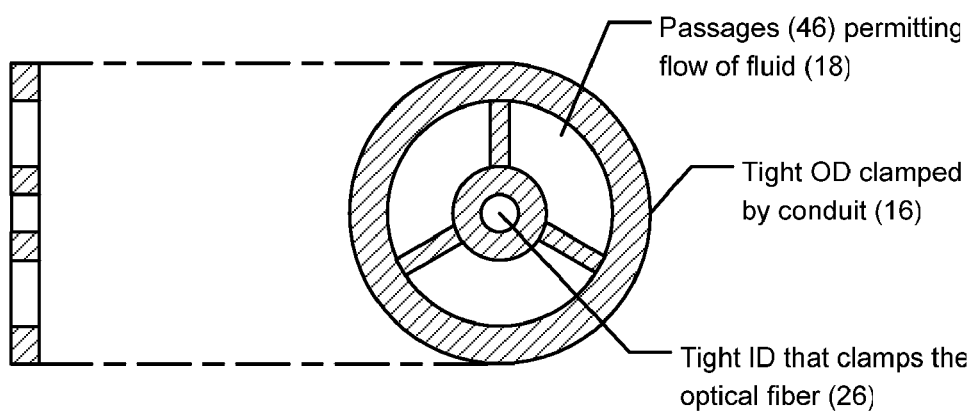
FIG. 3b. Retainer (44) in the FBG section (24)

FIG 5. Resonance frequency of FBG due to optical fiber stretch

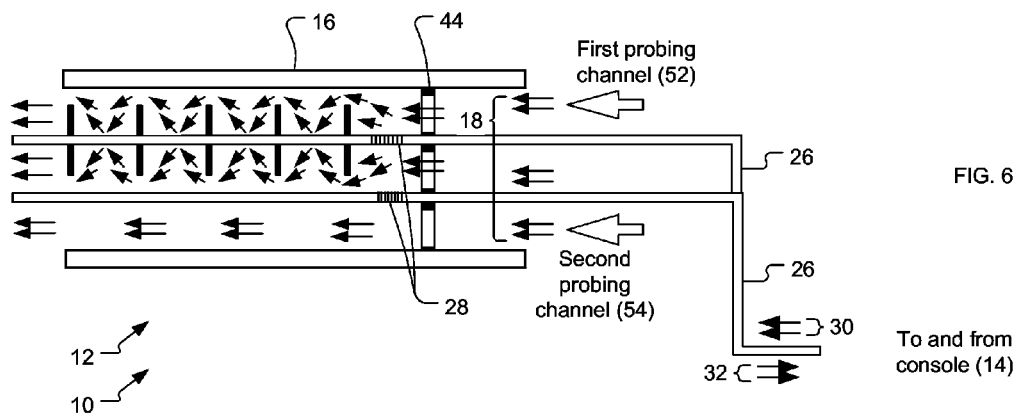
FIG. 6
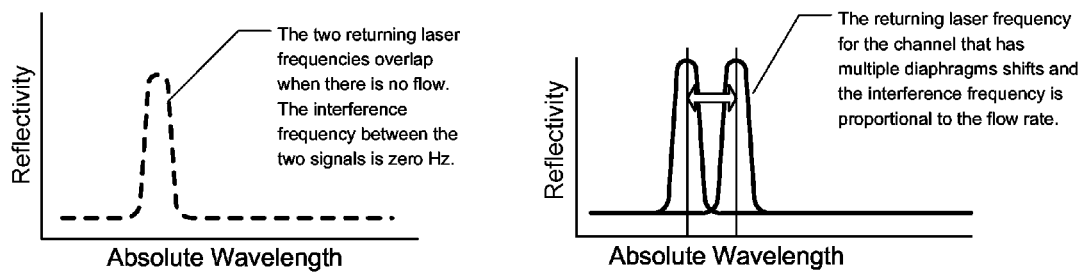

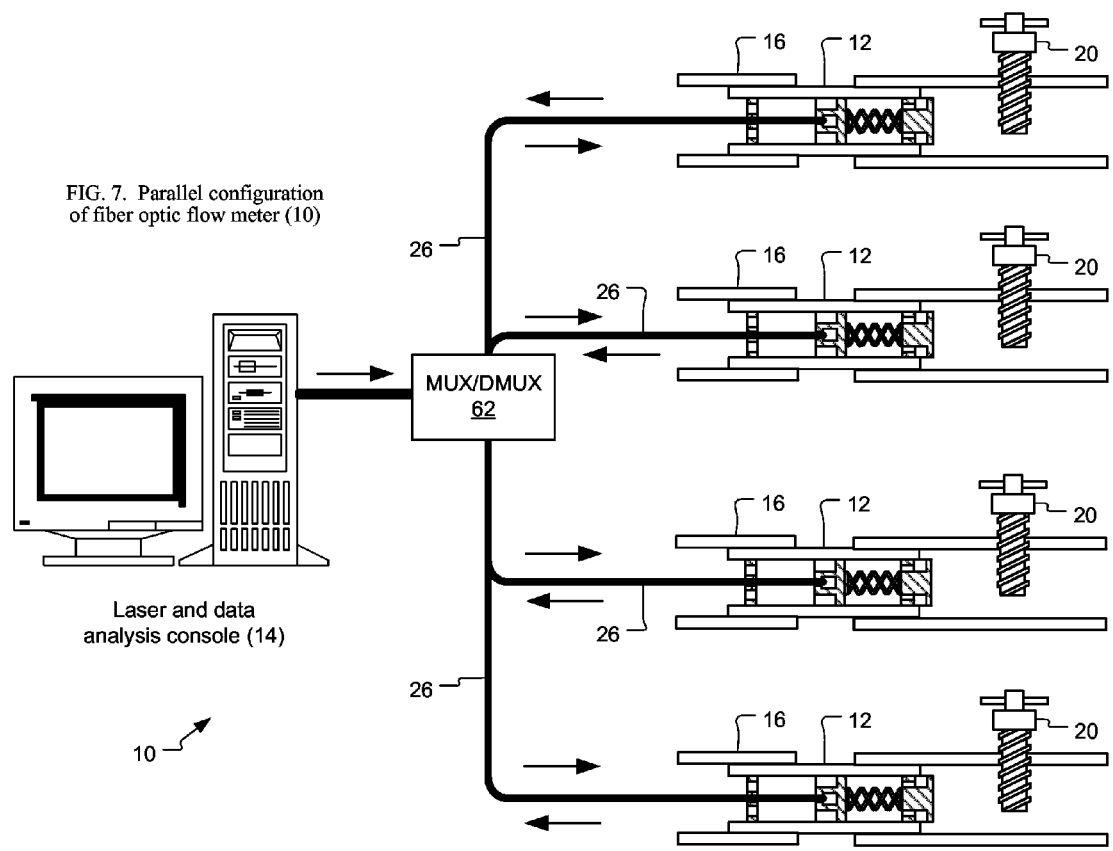
FIG. 7. Parallel configuration of fiber optic flow meter (10)

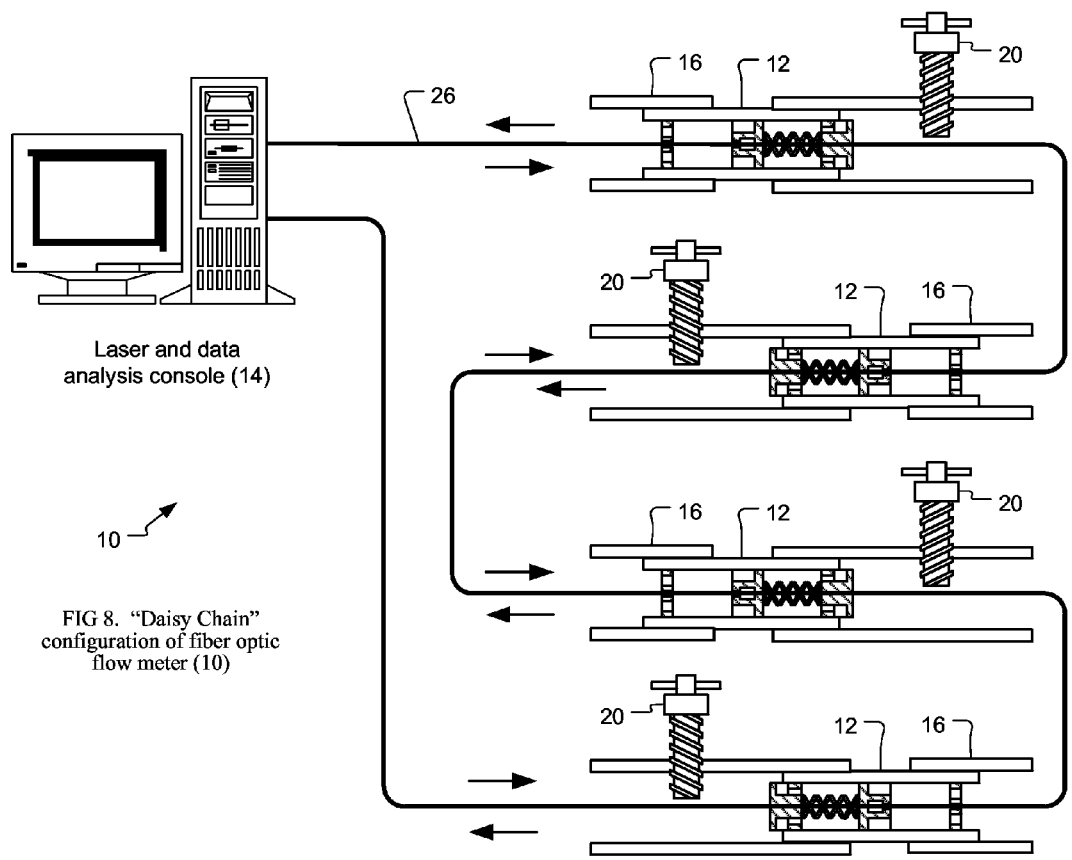
FIG 8. "Daisy Chain" configuration of fiber optic flow meter (10)

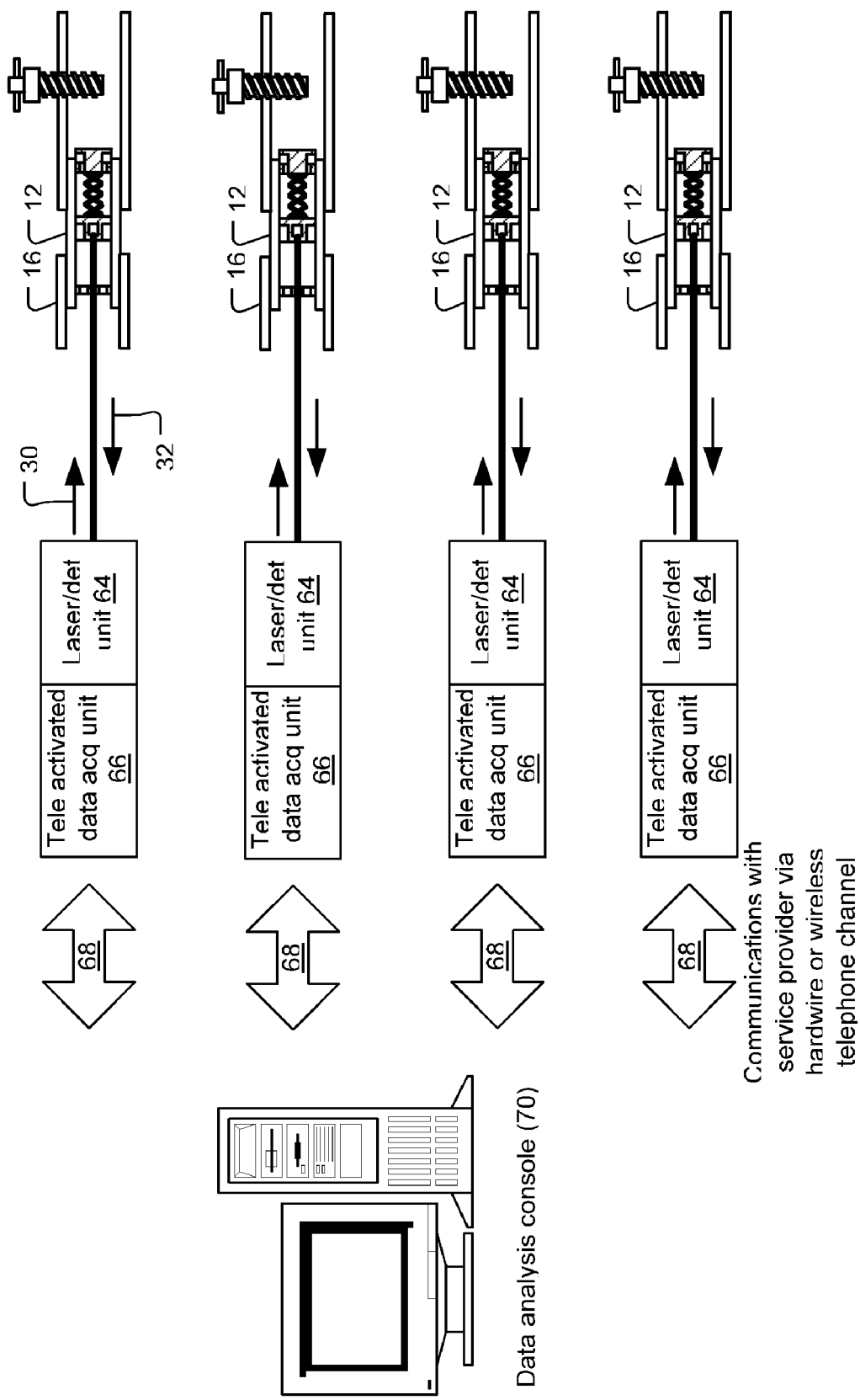
FIG. 9. Telephone-enhanced communications

FIBER OPTIC FLOW METER

CROSS-REFERENCE TO RELATED APPLICATIONS

This application claims the benefit of U.S. Provisional Application No. 60/481,851, filed Jan. 2, 2004, hereby incorporated by reference in its entirety.

TECHNICAL FIELD

The present invention relates generally to systems for using coherent light, and more particularly to optical fiber based systems for detecting and measuring fluid flow.

BACKGROUND ART

Fluid flow measurement is an important function in our daily lives. For example, a typical household in North America has at least two basic flow meters, one to measure the consumption of water and the other to measure the consumption of natural gas. Fluid flow measurement is also an important function for industry, for instance, where it is used to measure the amount of fluid transfer from one location to another. A typical utility company, such as Pacific Gas and Electric (PG&E™) needs to measure the amount of natural gas it transfers from storage facilities to distribution points, and then onward to consumers. Similarly, petroleum companies transport petroleum products from refineries to distribution points and onward to retailers. Furthermore, unknown to the typical end consumer, companies such as these make considerable use of fluid flow measurement in their manufacturing facilities. For instance, just in the major U.S. petrochemical processing centers of Torrance, Calif. and Houston, Tex., tens of thousands of fluid flow measuring devices are currently being employed.

Most existing flow meters require manual reading of the fluid flow. For example, PG&E personnel need to be sent periodically to each household or business to take natural gas meter readings. This is quite inefficient and costly. Another concern is that when fluid flow readings are taken manually, it may be difficult to humanly monitor the readings accurately or in a timely enough manner. For instance, there are frequent news reports of accidents where the leakage or breakage of natural gas or petroleum transport pipelines wastes money, causes safety hazards to nearby communities, and pollutes the environment. Accordingly, other approaches have long been sought.

Electrical flow meters are the primary alternative in use today. With suitable wiring these can permit remote fluid flow reading at some distance from the actual point of measurement. Unfortunately, there are many applications where the use of electrical flow meters is not practical. For example, the use of electricity can pose a fire hazard, particularly when the fluid itself or other materials around it are flammable. Also, many fluids react with metals such as copper and aluminum, which are the constituents of most electrical wire, or react with plastics, which are the desirable constituent of most electrical wire insulation. The monitoring distance for electrical flow meters may also be too short for many applications, because many of the monitoring devices require an adequate voltage to activate measurement components or because signal interference along long paths to and from those components may occur. Alternately, signal interference or electrical hazards caused by electrical wiring to electrical flow meters may be a concern for other nearby systems. For instance, in hospital operating rooms or sensitive laboratory environments.

In sum, improved systems for fluid flow measurement are needed. Such systems should preferably be non-electrical in principle and, without limitation, should work with both gas and liquid type fluids; work with wide ranges of chemically reactive fluids; work with fluids across a wide range of temperatures; permit reading at remote or more convenient locations; and permit entirely automated recording of readings.

DISCLOSURE OF INVENTION

Accordingly, it is an object of the present invention to provide an optical fiber based flow meter.

Briefly, one preferred embodiment of the present invention is a metering module for monitoring gas or liquid fluid flow in concert with a laser light source, a light detector and a processor. A valve section and a grating section including a fiber Bragg grating (FBG) are provided. The valve section applies strain on the FBG that is representative of the flow of the fluid. An optical fiber couples a probing laser signal to the FBG and the FBG reflects a portion back as a return laser signal that the optical fiber couples to the light detector.

Briefly, another preferred embodiment of the present invention is a system employing the metering module, wherein the laser light source, light detector and processor are also provided.

An advantage of the present invention is that it provides an improved system for fluid flow measurement.

Another advantage of the invention is that it is suitable for use with both gas and liquid type fluids, with a wide variety of chemically reactive fluids, and across a wide range of temperatures.

Another advantage of the invention is that it is particularly suitable for fluid flow measurement at remote or more convenient locations than where the flow is actually occurring.

And another advantage of the invention is that it is non-electrical in principle and may permit entirely automated fluid flow measurement and recording.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures in which:

FIG. 3a–b are schematic diagrams showing more details of the valve and FBG sections in the metering module of the flow meter in FIG. 1, wherein FIG. 3a depicts details of the valve section and FIG. 3b depicts details of a retainer in the FBG section.

FIG. 6 is a combined schematic diagram with graphs showing a feature than can be added to fiber optic flow meters in accord with the present invention.

FIG. 7 is a schematic diagram showing a multi-flow metering, parallel embodiment of a fiber optic flow meter in accord with the present invention FIG. 8 is a schematic diagram showing a multi-flow metering, serial or "daisy chain" embodiment of a fiber optic flow meter in accord with the present invention.

And FIG. 9 is a schematic diagram showing an example of a fiber optic flow meter in accord with the present invention that incorporates multiple metering modules and telephone communications.

In the various figures of the drawings, like references are used to denote like or similar elements or steps.

BEST MODE FOR CARRYING OUT THE INVENTION

Figure 1:
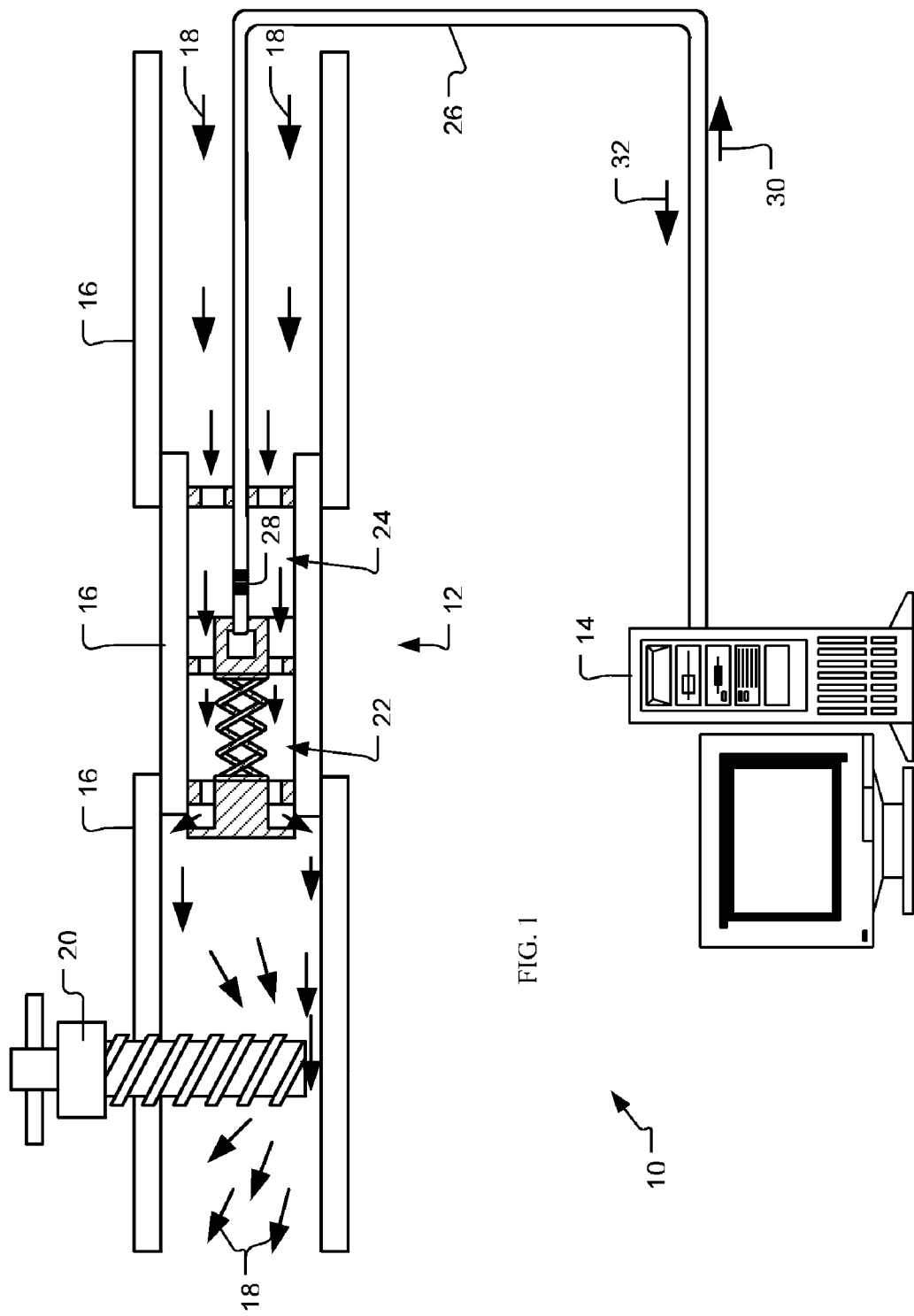
FIG. 1 is a schematic diagram showing one embodiment of a fiber optic flow meter in accord with the present invention.

A preferred embodiment of the present invention is a fiber optic flow meter. As illustrated in the various drawings herein, and particularly in the view of FIG. 1, preferred embodiments of the invention are depicted by the general reference character 10.

This invention provides an automatic, real time system to measure fluid flow without the need of electricity at the point of measurement. Basically, systems based on this invention utilize a mechanical valve assembly, which incorporates a fiber Bragg grating (FBG) to sense the amount of fluid that passes through the valve. The degree of valve opening is proportional to the amount of the liquid passing through. Systems based on this invention are thus straightforward once the underlying principles are grasped, easy to implement and maintain, and useful for safe and economic monitoring of fluid flow at very long distances. In addition, since optical fiber is the used for the primary active component and it is typically made of silica, it is not reactive to most fluids and no safety hazards or equipment degradations problems are therefore created.

FIG. 1 is a schematic diagram showing one embodiment of a fiber optic flow meter 10 in accord with the present invention. The flow meter 10 includes a metering module 12 and a laser and data analysis console 14. The flow meter 10 is applied in the context of a conventional fluid conduit 16 (e.g., a pipe) carrying either a gas or liquid fluid 18 (stylistically depicted by arrows in FIG. 1). Typically, but not necessarily, one or more conventional regulators will be present in the conduit 16 "upstream" or "downstream" from the metering module 12, and FIG. 1 includes regulator 20 as one example of such.

FIG. 1 depicts various details of the metering module 12. As can be seen, the metering module 12 is integrated into the conduit 16. Here this is done so that all of the fluid 18 passes through the metering module 12. As those skilled in the fluid control arts will appreciate, however, other straightforward embodiments are possible where only a portion of the fluid 18 passes directly through the metering module 12.

The major elements of the metering module 12 are a valve section 22, an FBG section 24, and an optical fiber 26. Portions of the valve section 22 and the FBG section 24 are physically attached to one another, as described in detail below. A portion of the FBG section 24 and one end of the optical fiber 26 (a "meter end") can be either physically attached and optically coupled, physically discrete and optically coupled, or physically and optically integrated together. FIG. 1 depicts the latter case. The other end of the optical fiber 26 (a "console end") is optically coupled to the console 14. The optical fiber 26 can vary in length as needed, for example and without limitation, ranging from 10 s of mm to 100 s of km before signal amplification becomes a concern.

The valve section 22 is pressure activated by the flow of the fluid 18, opening up to let the fluid 18 pass (when the regulator 20 and other conditions in the conduit 16 permit). As this occurs, the portion of the valve section 22 attached to the FBG section 24 applies a force, here based on stretching, to the attached portion of the FBG section 24.

The FBG section 24 includes an FBG zone 28 that behaves as a frequency monitor. This FBG zone 28 is preferably made to be in resonance with the frequency of a probing laser signal 30 provided from the console 14 (and having a path stylistically depicted by an arrow in FIG. 1). As the grating in the optical fiber of the FBG zone 28 is stretched, the grating spacing changes accordingly, causing the resonant frequency of the FBG zone 28 to shift.

A return laser signal 32 (also having its path stylistically depicted by an arrow in FIG. 1) is, here, reflected from the FBG zone 28 back to the console 14. This return laser signal 32, however, has a characteristic that varies in proportion to the change in the resonant frequency of the FBG zone 28, which itself varies in proportion to the pressure from the flow of the fluid 18 through the valve section 22. By appropriate measurement of the return laser signal 32 at the console 14, it thus becomes possible to calculate the flow of the fluid 18.

All of this provides a number of benefits. For example, since the laser signals 30, 32 used for monitoring are conducted through the optical fiber 26, there is no need for electricity anywhere near the point of actual measurement. Also, since the dissipation of laser intensity is very small in the optical fiber 26, the distance between the console 14 and the metering module 12 can be quite large, if desired.

Figure 2:
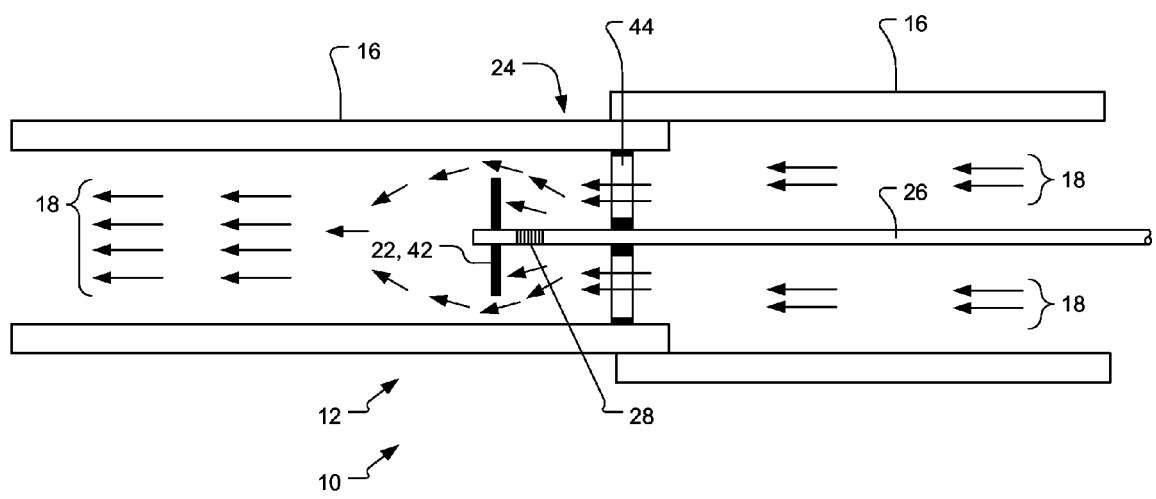
FIG. 2 is a schematic diagram showing a "most" basic embodiment of a fiber optic flow meter that is particularly suitable for study to appreciate operating principals of the invention.

FIG. 2 is a schematic diagram showing a "most" basic embodiment of the fiber optic flow meter 10 that is particularly suitable for study to appreciate operating principals of the invention. The flow meter 10 here consists essentially of only two parts, analogous to the valve section 22 and FBG section 24 in FIG. 1. The role of the valve section 22 here is filled by a simple diaphragm 42 that is fixedly attached to the meter end of the optical fiber 26, and the role of the FBG section 24 here is filled by a FBG zone 28 integrated directly into the meter end of the optical fiber 26 and fixedly attached to the conduit 16 by a retainer 44. As fluid 18 flows past the diaphragm 42 the FBG zone 28 is stretched, changing the resonant frequency of the FBG zone 28 in a manner measurable at the console 14 (not shown in FIG. 2).

Even this basic embodiment of the flow meter 10 in FIG. 2 can, however, have considerable variation based on design preference or straightforward adaptation for specific applications. For example, the embodiment shown (as well as that in FIG. 1) stretch the FBG zone 28 to change its grating spacing. Alternate embodiments can instead use component placements so that an FBG zone is compressed to change its grating spacing. The simple diaphragm 42 in FIG. 2 visually appears more like a rigid baffle, having no apparent deflection due to the flow of the fluid 18. This element may be a truly rigid baffle, a flexible diaphragm, or a more complicated mechanism like the valve section 22 in FIG. 1. The retainer 44 in FIG. 2 is not depicted as particularly directing the flow of the fluid 18 or as acting as an orifice to it, but fluid control principles such as these can also be integrated into the inventive flow meter 10 here if desired.

If the medium of the fluid 18 is gaseous, the pressure on the diaphragm 42 is proportional to $p*v^2$, where p is the gas density and v is the flow velocity. If the medium of the fluid 18 is liquid, then the pressure on the diaphragm 42 is proportional to $p*v$, where v is the flow velocity. For a gaseous medium, the total force on the diaphragm 42 is $F=p*v^2*A$, where A is the area of the diaphragm 42. For a liquid medium, this force is also $F=p*v^2*A$.

This force F pulls the optical fiber in the FBG zone 28 and makes its length slightly longer, by the equation $F=k*\Delta x$, where k is the elastic constant of the optical fiber and $\Delta x$ is the elongation of the optical fiber. This elongation $\Delta x$ causes the pitch of the line pattern of the FBG to deviate from the original resonant wavelength and reduces the reflectivity there at. By measuring the change of this reflectivity with the probing laser signal, as has been discussed above, one can measure the flow of the fluid 18.

In certain applications, the flow rate of a fluid 18 in the conduit 16 can be very high and the applied pressure may exceed the elastic limit of the optical fiber in the FBG zone 28. To overcome this, a more sophisticated valve section 22 than a simple baffle or diaphragm 42 can be used. See e.g., FIG. 1.

FIG. 3a–b are schematic diagrams showing more details of the valve section 22 and the FBG section 24 in the metering module 12 in FIG. 1. In FIG. 3a, a sophisticated valve section 22 is shown that has multiple passages 46 through which the fluid 18 flows, exerting pressure that stretches a spring 48 connected to a clamp 50 attached to the meter end of the optical fiber 26 (not shown here). In FIG. 3b, a retainer 44 is shown that also has multiple passages 46 through which the fluid 18 flows. The retainer 44, however, has no moving parts. It is fixedly held in the conduit 16 here by an outside diameter (OD) interference fit, and it then fixedly holds the optical fiber 26 (not shown) here by an inside diameter (ID) interference fit. Note, the FBG zone 28 is presumed here to be integrated into the meter end of the optical fiber 26 (see e.g., FIG. 1–2). If some another arrangement is used in the FBG zone 28, the retainer 44 and the clamp 50 then need to be respectively attached to opposite ends of the FBG zone 28.

With reference again also to FIG. 1, and particularly to the regulator 20 there, when regulation of the flow of the fluid 18 is absolute, i.e., the flow is totally stopped, the separation between the valve section 22 (specifically, the clamp 50 in FIG. 1 or the diaphragm 42 in FIG. 2) and the retainer 44 remains fixed. By design this can particularly be where the frequency of the probing laser signal 30 and the and the resonant frequency of the grating in the FBG zone 28 match.

When the regulation changes, i.e., when flow of the fluid 18 commences, a pressure gradient is created before and after the valve section 22, causing the fluid 18 to flow through the valve section 22. This flow exerts a force on the movable surfaces in the valve section 22 that causes those elements to move toward the left (in FIG. 1–2) so that the fluid 18 can pass through. This movement, in turn, stretches both the spring 48 and the grating in the FBG zone 28.

The amount of stretch of the spring 48 and the optical fiber grating as a whole is described by $\Delta X = \Delta X1 + \Delta X2$, where $\Delta X1$ is the stretch of the spring 48 and $\Delta X2$ is the stretch of the optical fiber grating. Assuming that K1 is the spring constant of the spring 48 that is being used, and that K2 is the elastic constant of the optical fiber in the grating, we have $\Delta X1 = K2*\Delta X2/K1$.

It is a simple design exercise to choose a proper ratio so that the stretch of the optical fiber in the grating is much smaller than the stretch of the spring 48. This can not only protect the optical fiber (the FBG zone 28) from being damaged or even breaking, but can also keep the line pitch of the FBG stretched at a particular desired scale that simplifies processing at the laser and data analysis console 14.

Figure 4:
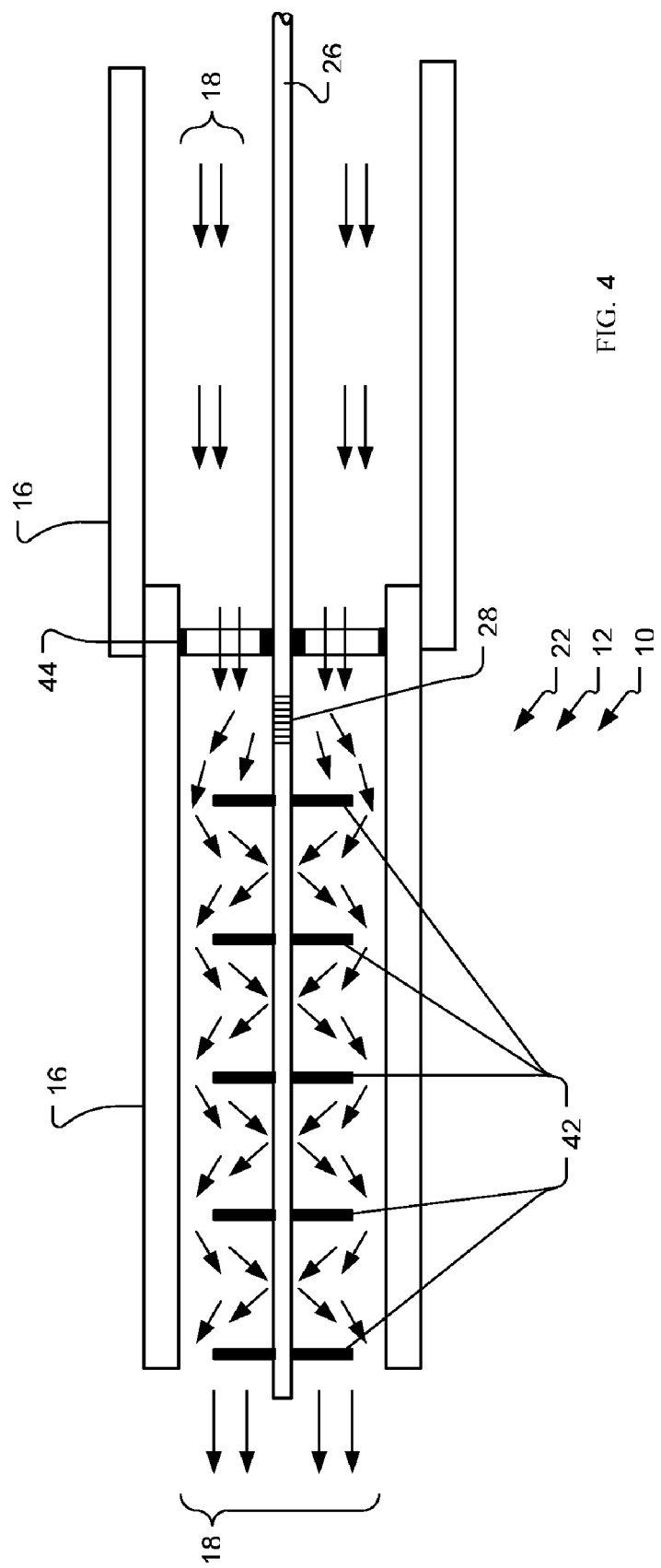
FIG. 4 is a schematic diagram showing a more sophisticated embodiment of the "basic" flow meter introduced in FIG. 2.

FIG. 4 is a schematic diagram showing a more sophisticated embodiment of the "basic" fiber optic flow meter 10 in FIG. 2. Rather than have a single diaphragm 42, multiple diaphragms 42 (or baffles) can be attached to the FBG zone 28 to magnify the force applied to it by the flow of a fluid 18. Various motivations for this may exist. For example, without limitation, this approach can be used to increase the sensitivity of the flow meter 10 to monitor much smaller flows. Or this can be used to facilitate materials selection or dimensioning for the FBG zone 28.

Figure 5:
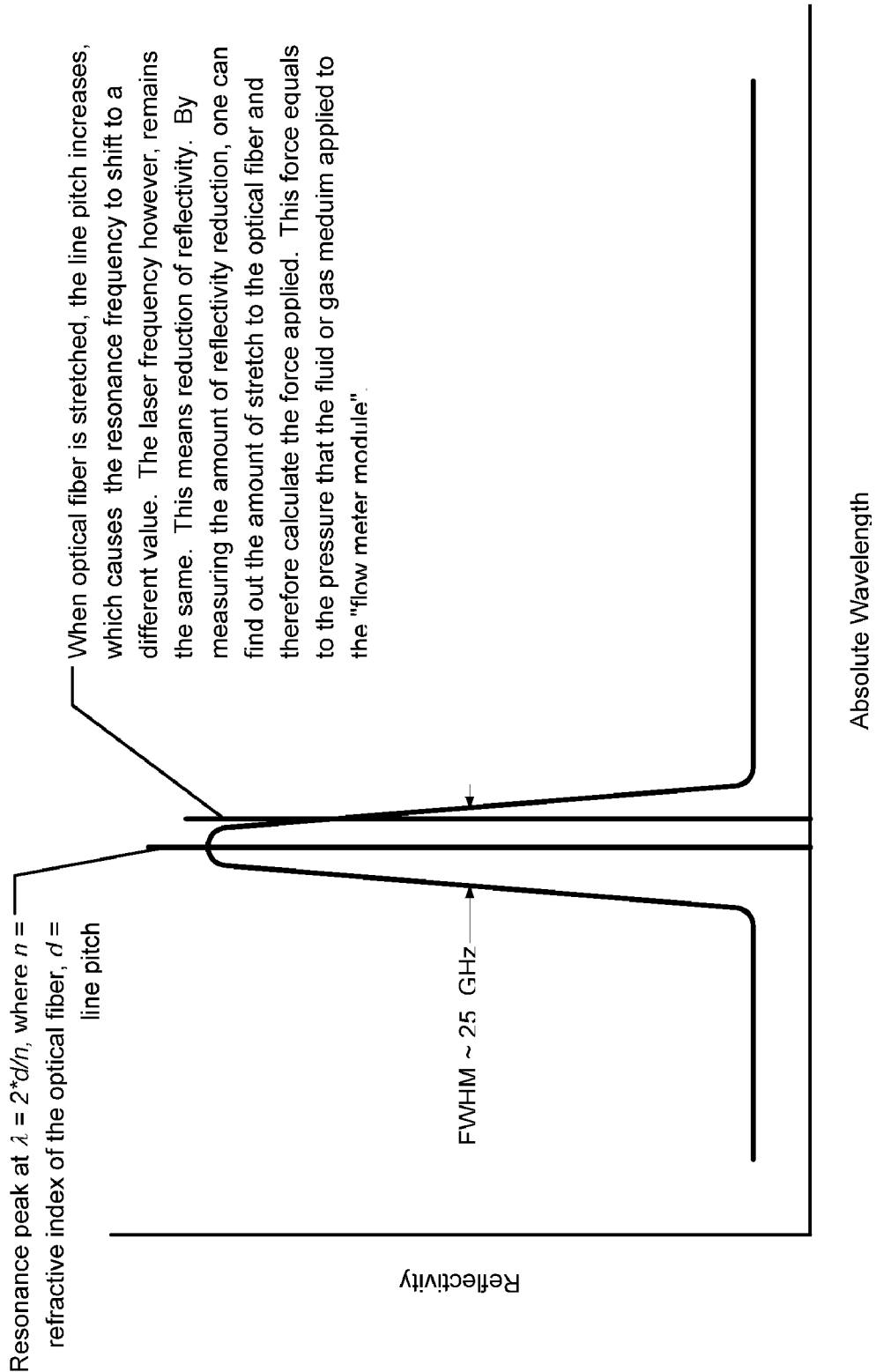
FIG. 5 is a graph showing a typical reflectivity curve for a suitable grating in the FBG section of a fiber optic flow meter in accord with the present invention.

FIG. 5 is a graph showing a typical reflectivity curve for a suitable grating in the FBG section 24. A fiber Bragg grating for this may be made in conventional manner, for instance, by exposing erbium doped optical fiber under a line-patterned ultraviolet (UV) light. The line pattern then can easily be set to match with a desired laser wavelength, according to $d=n*\lambda/2$, where d is the line spacing of the pattern, n is the refractive index of the optical fiber, and $\lambda$ is the laser wavelength in resonance with the line space d.

By setting the probing laser signal 30 (FIG. 1) to $\lambda$, the greatest proportion of that signal will be reflected by the FBG zone 28 as the return laser signal 32 when the above equation is satisfied. As discussed above, the line pattern of the optical fiber can be d when the regulator 20 is closed. Opening the regulator 20 then permits the fluid 18 to flow, and causes the optical fiber to stretch and the line space to become $d+\Delta d$ The reflectivity of the FBG zone 28 is then reduced, because it is stretched and no longer in resonance with the frequency of the probing laser signal 30. Measuring the drop of reflectivity then allows one to find $\Delta d$, and comparison of calibrated values of $\Delta d$ versus fluid pressure allows one to determine the actual flow of the fluid 18.

FIG. 6 is a combined schematic diagram with graphs showing another feature that can be added to the flow meter 10. To enhance the accuracy and sensitivity of flow rate measurements, the FBG section 24 can include a second FBG zone 28 adjacent to the first one. That is, the flow meter 10 here can have a first probing channel 52 and a second probing channel 54. The FBG zone 28 in the second probing channel 54, however, does not have any diaphragms 42 attached and is used purely as a reference. By providing a probing laser signal 30 to both FBG zones 28, two return laser signals 32 are obtained.

The two return laser signals 32 can each be processed in the manner used for a single channel (e.g., converted to electrical signals in the console 14 with photodiodes and then compared), but more sophistication can be applied here. Since the two return laser signals 32 are optical, they can be mixed to produce an interference frequency that can then be very accurately measured and processed at the console 14.

When there is no flow, the interference frequency will remain fixed. (For simplicity, two FBG zones 28 with the same resonance wavelength can be used and the interference frequency will become zero when there is no flow. The graph on the left side of FIG. 6 depicts this condition.) When there is a flow, the response frequency for the FBG zone 28 that has diaphragms 42 attached will shift and the difference between the two FBG zones 28 will start to change, with the resulting frequency difference proportional to the flow rate in the conduit 16. (The graph on the right side of FIG. 6 depicts this condition.) Since the interference frequency can be measured down to one Hertz, the sensitivity when measuring flow rates using this approach is very high. Also, since the interference frequency can be produced by the same laser source, any frequency instability will be cancelled during mixing. This insures that the accuracy of measurements made using this approach will also be very high.

In fact, this "reference-channel" augmented approach overcomes some of the more vexing problems often associated with the use fiber Bragg gratings (FBGs). As is well known in the art, FBGs are affected by temperature, prolonged strain, and aging. By using the two probing channels 52, 54 as a "measurement-channel" and a "reference-channel," any effects due to these problems can be canceled out.

Alternately, to minimize any temperature effects even in single-channel embodiments of the flow meter 10, the FBG zone 28 used can be modified to be athermal. A source for such athermal FBGs is Fibera, Inc. of Santa Clara, Calif.

The laser and data analysis console 14 is not discussed in detail herein, since those of ordinary skill in the relevant arts will readily appreciate how simple apparatus for it can be assembled. The console 14 will typically include a laser source, one or more photodiode detectors, and a computer, although simpler or more complex apparatus may also be used.

FIG. 7 is a schematic diagram showing a multi-flow metering, parallel embodiment of a fiber optic flow meter 10 in accordance with the present invention, and FIG. 8 is a schematic diagram showing a multi-flow metering, serial or "daisy chain" embodiment of a fiber optic flow meter 10 in accordance with the present invention.

In the parallel configuration (FIG. 7), the laser intensity from the laser and data analysis console 14 is multiplexed into several paths by a MUX/DMUX unit 62 (e.g., by a conventional assembly of beam splitters there within). Each optical fiber 26 going to a respective metering module 12 thus receives adequate light intensity (i.e., a probing laser signal 30 such as that in FIG. 1) to monitor the flow of fluid in its own conduit 16. The reflected light (i.e., a return laser signal 32 such as that in FIG. 1) is returned through the same optical fiber 26, is now de-multiplexed by the MUX/DMUX unit 62, and reaches the console 14. In the console 14, the reflected intensity from each metering module 12 is detected (e.g., by a conventional assembly of photodiodes, filters, etc.). These reflected intensities are then recorded, if desired, and compared with the full intensities, which will have typically been pre-recorded. In the manner already discussed, the ratios found can then be used to determine the line pitch shift of the respective FBGs and thus of actual fluid flows in the respective metering modules 12.

In the daisy chain configuration (FIG. 8), the laser beam provided by the console 14 does not need to be multiplexed but its spectrum does need to be broad or tunable, so that each metering module 12 can use a different resonant frequency that it can be distinguished from the others. As previously explained, the reflectivity of a FBG will vary when fluid flows through. The light reflected by this is then detected, for example, by a respective photodetector in the laser and data analysis console 14. Since the power loss in the optical fiber 26 is very low, very long monitoring distances can be achieved. Theoretically, up to 100 km distances are achievable. This is particularly convenient for some applications, e.g., for utility companies providing natural gas or water that have large customer bases and need to monitor their usage periodically. As has been discussed in the Background Art section herein, monitoring such usage without having to manually take meter readings can save significant money and improve efficiency.

FIG. 9 is a schematic diagram showing an example of a fiber optic flow meter 10 incorporating multiple metering modules 12 and telephone communications. Here, metering modules 12 are placed in one or more conduits 16, as desired. A parallel configuration is shown in FIG. 9, but "daisy chain" or a combination parallel/serial arrangements are also easily implemented.

The metering modules 12 (or groupings of them in complex embodiments) have a laser/detector unit 64, telephone data acquisition unit 66, and telephone channel 68. The laser/detector units 64 provide probing laser signals 30 to and receive return laser signals 32 back from their respective metering modules 12, and they provide data about respective measured fluid flows to their associated telephone data acquisition units 66. This data can be for current flow levels, or such can be accumulated over time and the data that the telephone data acquisition units 66 report sends to a data analysis console 70 can be for volume flow (e.g., total consumption).

The data analysis console 70 can query each telephone data acquisition unit 66, for instance, by dialing different telephone numbers assigned to each telephone data acquisition unit 66. Alternately, the telephone data acquisition units 66 can be configured to respectively dial a single telephone number assigned to the data analysis console 70 and report in, periodically or as triggered by an event such as a preset flow or volume level.

Embodiments such as this are particularly suitable when metering is widely dispersed at many households, businesses, or industrial sites. For example, a utility company, such as a natural gas or water provider, can rent separate telephone numbers for the telephone channels 68 to each site or household, or it can have just one number for a common telephone channel 68 that is used in the manner of a traditional telephone "party line."

This telephone-enhanced approach can help offset the significant installation cost of providing optical fiber to each site or household, in cases where such has yet to be done. For communities that do not yet have fiber optic cabling, the inventive fiber optic flow meter 10 can be installed concurrently. In many cases, the ability to add fiber optic flow meters 10 along with other fiber cable-based services can provide synergistic economic incentives and multiple-entity partnerships that can make fiber optic cabling viable. Of course, for communities that already have fiber optic cabling installed, adoption of the inventive fiber optic flow meter 10 is even easier and more economical, because there is no need then to add substantial new optical cable or to add mechanisms to convert optical signals to electrical format for metering of fluids 18 until at a centralized console 14.

Of course, still more sophisticated embodiments of the inventive fiber optical flow meter 10 are possible. Applications in households, business, industries, and even health care have been noted herein. No exhaustive listing of applications of the inventive flow meter 10 is possible. Rather, the reader should appreciate that various embodiments can be tailored to needs as they arise. For instance, without limitation, hard wired or wireless communications links can be used, telephonic or otherwise, shared or dedicated, for protracted data acquisition and analysis or for real time monitoring purposes.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

What is claimed is:

1. A system for monitoring fluid flow, wherein the fluid may be a gas or liquid, the system comprising:
   a laser light source, a light detector, and a processor; and
   a metering module including a valve section, a grating section including a fiber Bragg grating (FBG), and an optical fiber; and
   wherein said valve section applies a strain on said FBG that is representative of the flow of the fluid, said laser light source provides a probing laser signal, said optical fiber couples said probing laser signal to said FBG, said FBG reflects a portion of said probing laser signal as a return laser signal, said optical fiber couples said return laser signal to said light detector, and said light detector converts said return laser signal to data from which said processor calculates the flow of the fluid.

2. The system of claim 1, wherein:
   said valve section includes a face portion, a spring, and a seat portion; and
   wherein said spring biases said face portion and said seat portion together in opposition to the flow of the fluid.

3. The system of claim 1, wherein said valve section includes at least one of a diaphragm and a baffle to oppose the flow of the fluid and said least one of a diaphragm and a baffle are attached to said FBG.

4. The system of claim 1, wherein said FBG in said grating section is integral with said optical fiber.

5. The system of claim 1, wherein:
   said FBG is a first FBG, said optical fiber is a first optical fiber, said probing laser signal is a first probing laser signal, and said return laser signal is a first return laser signal; and
   further comprising
   said grating section including a second FBG;
   a second optical fiber; and
   wherein said valve section to not apply a strain on said second FBG that is representative of the flow of the fluid, said second optical fiber to couple said second probing laser signal to said second FBG, said second FBG to reflect a portion of said second probing laser signal as a second return laser signal, said second optical fiber to couple said second return laser signal to said light detector, thereby permitting use of said second return laser signal as a reference against said first return laser signal.

6. The system of claim 5, further comprising:
   an interferometer to combine said first return laser signal and said second return laser signal prior to detection in said light detector.

7. The system of claim 1, further comprising:
   a plurality of said metering modules; and
   a multiplexor/demultiplexor; and
   wherein said optical fiber includes a first portion that couples said probing laser signal to said multiplexor/demultiplexor and that couples said return laser signal from said multiplexor/demultiplexor to light detector, said optical fiber includes second portions that couple said probing laser signal said plurality of said metering modules and that couple said return laser signal from said plurality of said metering modules to said multiplexor/demultiplexor, thereby permitting multiplex monitoring of a plurality of the flows of a plurality of the fluids at a plurality of locations.

8. The system of claim 1, further comprising:
   a plurality of said metering modules each having said FBGs exhibiting different resonance frequencies; and wherein
   said laser light source produces said probing laser signal including all said different resonance frequencies;
   said light detector selectably detects light ranges including all said different resonance frequencies in said return laser signal; and
   said optical fiber serially couples said probing laser signal to all of said plurality of said metering modules and serially couples said returning laser signal from all of said plurality of said metering modules.

9. The system of claim 1 wherein said light detector and said processor are physically separated, the system further comprising a communications link for communicating a signal from the light detector to said processor.

10. A metering module for monitoring fluid flow with a light detector and a processor, wherein the fluid may be a gas or liquid, comprising:
    a valve section;
    a grating section including a fiber Bragg grating (FBG); and
    an optical fiber; and
    wherein said valve section to apply a strain on said FBG that is representative of the flow of the fluid, said optical fiber to couple a probing laser signal to said FBG, said FBG to reflect a portion of said probing laser signal as a return laser signal, and said optical fiber to couple said return laser signal to the light detector.

11. The metering module of claim 10, wherein:
    said valve section includes a face portion, a spring, and a seat portion; and
    wherein said spring biases said face portion and said seat portion together in opposition to the flow of the fluid.

12. The metering module of claim 10, wherein said valve section includes at least one of a diaphragm and a baffle to oppose the flow of the fluid and said least one of a diaphragm and a baffle are attached to said FBG.

13. The metering module of claim 10, wherein said FBG in said grating section is integral with said optical fiber.

14. The metering module of claim 10, wherein:
    said FBG is a first FBG, said optical fiber is a first optical fiber, said probing laser signal is a first probing laser signal, and said return laser signal is a first return laser signal; and
    further comprising
    said grating section including a second FBG;
    a second optical fiber; and
    wherein said valve section to not apply a strain on said second FBG that is representative of the flow of the fluid, said second optical fiber to couple second probing laser signal to said second FBG, said second FBG to reflect a portion of said second probing laser signal as a second return laser signal, said second optical fiber to couple said second return laser signal to the light detector, thereby permitting use of said second return laser signal as a reference against said first return laser signal.

* * * * *